(12) United States Patent
Bae (10) Patent No.: US 10,063,085 B2
(45) Date of Patent: Aug. 28, 2018

(54) POWER SUPPLYING APPARATUS AND WIRELESS POWER TRANSMITTER

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 293 days.

(21) Appl. No.: 14/442,208

(22) PCT Filed: Nov. 11, 2013

(86) PCT No.: PCT/KR2013/010207
§ 371 (c)(1),
(2) Date: May 12, 2015

(87) PCT Pub. No.: WO2014/073932
PCT Pub. Date: May 15, 2014

(65) Prior Publication Data
US 2016/0261144 A1    Sep. 8, 2016

(30) Foreign Application Priority Data

Nov. 12, 2012 (KR) .......................... 10-2012-0127747

(51) Int. Cl.
| | |
|---|---|
| *H04B 5/00* | (2006.01) |
| *H01F 38/14* | (2006.01) |
| *G05F 1/656* | (2006.01) |
| *H02M 3/158* | (2006.01) |
| *H02J 17/00* | (2006.01) |
| *H02J 5/00* | (2016.01) |
| *H02J 7/02* | (2016.01) |
| *H02J 50/40* | (2016.01) |
| *H02J 50/80* | (2016.01) |

(Continued)

(52) U.S. Cl.
CPC .............. *H02J 7/025* (2013.01); *H02J 5/005* (2013.01); *H02J 17/00* (2013.01); *H02J 50/12* (2016.02); *H02J 50/40* (2016.02); *H02J 50/80* (2016.02); *H02J 50/90* (2016.02)

(58) Field of Classification Search
CPC ............ H02J 9/061; H02J 9/062; H02M 3/04; H02M 1/42; H02M 7/04; H02M 7/44
USPC .................................. 307/94–107, 160–176
See application file for complete search history.

(56) References Cited

U.S. PATENT DOCUMENTS

| | | | | |
|---|---|---|---|---|
| 5,946,206 A | * | 8/1999 | Shimizu | ................ H02M 3/285 363/16 |
| 6,115,267 A | * | 9/2000 | Herbert | ............... H02M 1/4258 363/132 |

(Continued)

FOREIGN PATENT DOCUMENTS

WO    WO 2011/148254 A2    12/2011

*Primary Examiner* — Brandon S Cole
(74) *Attorney, Agent, or Firm* — Birch, Stewart, Kolasch & Birch, LLP (57) ABSTRACT

A power supplying apparatus includes a power supply and an alternating current (AC) power generator. The power supply generates a direct current (DC) power. The alternating current (AC) power generator comprises an inductor configured to generate an AC power based on the DC power, wherein the AC power comprises a first AC power with a first AC voltage and a second AC power with a second AC voltage, and the first AC voltage and the second AC voltage have phases opposite to each other.

17 Claims, 6 Drawing Sheets

(51) Int. Cl.
*H02J 50/90* (2016.01)
*H02J 50/12* (2016.01)

(56) References Cited

U.S. PATENT DOCUMENTS

| | | | | |
|---|---|---|---|---|
| 6,195,273 | B1* | 2/2001 | Shteynberg | H02M 1/44 363/26 |
| 6,366,474 | B1* | 4/2002 | Gucyski | G05F 1/70 323/266 |
| 6,963,497 | B1* | 11/2005 | Herbert | H02M 3/07 363/133 |
| 7,061,212 | B2* | 6/2006 | Phadke | H02M 1/4225 323/222 |
| 7,373,527 | B2* | 5/2008 | Chapuis | H02J 1/102 307/29 |
| 8,354,828 | B2* | 1/2013 | Huang | H02M 1/14 307/31 |
| 8,471,411 | B2 | 6/2013 | Urano | |
| 8,493,751 | B2* | 7/2013 | Schlecht | H02M 3/335 363/21.06 |
| 8,724,356 | B2* | 5/2014 | Pan | H02M 7/48 323/266 |
| 8,760,897 | B2* | 6/2014 | Yang | H02M 3/005 323/266 |
| 2004/0134460 | A1* | 7/2004 | Kino | F02M 35/1216 123/198 E |
| 2004/0141346 | A1* | 7/2004 | Hiratsuka | H02M 7/493 363/131 |
| 2004/0246754 | A1* | 12/2004 | Chapuis | H02J 1/08 363/89 |
| 2005/0013084 | A1* | 1/2005 | Weger | H01F 27/38 361/143 |
| 2010/0084918 | A1* | 4/2010 | Fells | H02J 5/005 307/32 |
| 2011/0080755 | A1* | 4/2011 | Huang | H02M 1/14 363/13 |
| 2011/0141772 | A1 | 6/2011 | Kim et al. | |
| 2011/0285210 | A1* | 11/2011 | Lemmens | H02J 5/005 307/104 |
| 2012/0056487 | A1 | 3/2012 | Choi et al. | |
| 2012/0062345 | A1* | 3/2012 | Kurs | H03H 7/40 333/235 |
| 2012/0098348 | A1* | 4/2012 | Inoue | B60L 11/123 307/104 |
| 2013/0057207 | A1 | 3/2013 | Ichikawa et al. | |
| 2013/0241304 | A1* | 9/2013 | Bae | H04B 5/0037 307/104 |
| 2013/0313911 | A1* | 11/2013 | Bae | H01F 38/14 307/104 |
| 2014/0232366 | A1* | 8/2014 | Lawson | H02J 3/32 323/282 |

* cited by examiner

POWER SUPPLYING APPARATUS AND WIRELESS POWER TRANSMITTER

TECHNICAL FIELD

The embodiment relates to a power supplying apparatus. The embodiment relates to a wireless power transmitter.

BACKGROUND ART

A wireless power transmission or a wireless energy transfer refers to a technology of wirelessly transferring electric energy to desired devices. In the 1800s, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance thereof is short.

Until now, wireless energy transmission schemes comprise a remote telecommunication technology based on resonance and a short wave radio frequency in addition to the electromagnetic induction.

Among the above wireless power transmission technologies, an energy transfer technology based on magnetic resonance has been recently spotlighted.

In a wireless power transmitting system employing magnetic resonance, since an electrical signal generated between the transmitting side and the receiving side is wirelessly transferred through coils, a user may easily charge electronic appliances such as a portable device.

DISCLOSURE OF INVENTION

Technical Problem

The wireless power transmitter generates AC power having a resonant frequency to transfer the AC power to a wireless power receiver. There is a need for a scheme to easily generate AC power having a resonant frequency by the wireless power transmitter. A request for increase in the wireless power transmission efficiency has been increased.

Solution to Problem

The embodiment provides a power supplying apparatus capable of easily generating AC power with a resonant frequency.

The embodiment provides a power supplying apparatus capable of improving wireless power transmission efficiency.

The embodiment provides a wireless power transmitter including a power supplying apparatus.

According to the embodiment, there is provided a power supplying apparatus including: a power supply to generate a direct current (DC) power; and an alternating current (AC) power generator including an inductor to generate an AC power based on the DC power, wherein the AC power comprises a first AC power with a first AC voltage and a second AC power with a second AC voltage, and the first AC voltage and the second AC voltage have phases opposite to each other.

According to the embodiment, there is provided wireless power transmitter including: a power supply to generate a direct current (DC) power; and an alternating current (AC) power generator including an inductor to generate an AC power based on the DC power; and a transmission coil to transmit the AC power to a wireless power receiver, wherein the AC power comprises a first AC power with a first AC voltage and a second AC power with a second AC voltage, and the first AC voltage and the second AC voltage have phases opposite to each other.

Advantageous Effects of Invention

The embodiment can reduce complexity of generation of a control signal in order to generate AC power with a resonant frequency. This may reduce complexity of a structure of the wireless power transmitter and increase efficiency of the wireless power transmitter.

BEST MODE FOR CARRYING OUT THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Hereinafter, the embodiment will be described with reference to accompanying drawings. The thickness and size of each layer shown in the drawings may be exaggerated, omitted or schematically drawn for the purpose of convenience or clarity. In addition, the size of each layer does not utterly reflect an actual size.

Hereinafter, a wireless power transmission system according to one embodiment will be described with reference to FIGS. 1 to 4.

Figure 1:
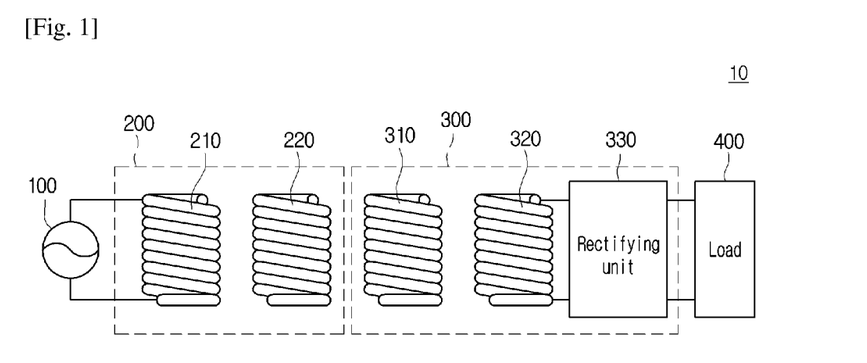
FIG. 1 is a view showing a wireless power transmission system according to one embodiment.

FIG. 1 is a view showing a wireless power transmission system according to one embodiment.

Referring to FIG. 1, the wireless power transmission system may comprise a power supplying apparatus 100, a wireless power transmitter 200, a wireless power receiver 300 and a load 400.

According to one embodiment, the power supply apparatus 100 may be included in the wireless power transmitter 200, but the embodiment is not limited thereto.

The wireless power transmitter 200 may comprise a transmission induction coil 210 and a transmission resonant coil 220.

The wireless power receiver 300 may comprise a reception resonant coil 310, a reception induction coil 320, and a rectifying unit 330.

Both terminals of the power supplying apparatus 100 are connected to both terminals of the transmission induction coil 210.

The transmission resonant coil 220 of the wireless power transmitter 200 may be spaced apart from the transmission induction coil 210 by a predetermined distance. That is, the transmission resonant coil 220 may be spaced apart from the transmission induction coil 210.

The reception resonant coil 310 of the wireless power receiver 300 may be spaced apart from the reception induction coil 320 by a predetermined distance.

FIG. 1 illustrates a magnetic resonance scheme.

The embodiment is applicable to transmit power in an electromagnetic induction scheme as well as a magnetic resonance scheme. In this case, for example, the transmission resonant coil 220 and the reception resonant coil 310 of FIG. 1 may not be formed. In this case, AC power of the wireless power transmitter 200 may be transmitted to the wireless power receiver 300 between the transmission induction coil 210 and the reception induction coil 320 in the electromagnetic induction scheme.

Both terminals of the reception induction coil 320 are connected to both terminals of the rectifying unit 330, and the load 400 is connected to both terminals of the rectifying unit 330. According to one embodiment, the load 400 may be included in the wireless power receiver 300, but the embodiment is not limited thereto.

The power generated from the power supplying apparatus 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power supplying apparatus 100 generates AC power having a preset frequency and transmits the AC power to the wireless power transmitter 200.

The transmission induction coil 210 and the transmission resonant coil 220 are inductively coupled with each other. In other words, if AC signal flows through the transmission induction coil 210 due to the power received from the power supplying apparatus 100, the AC signal is induced to the transmission resonant coil 220 physically spaced apart from the transmission induction coil 210 due to the electromagnetic induction.

Thereafter, the power received in the transmission resonant coil 220 is transmitted to the wireless power receiver 300, which makes a resonance circuit with the wireless power transmitter 200, through resonance.

Power can be transmitted between two LC circuits, that is, the transmission resonant coil 220 and the reception resonant coil 310, which are impedance-matched with each other, through resonance. The power transmitted using the resonance can be farther transmitted with higher efficiency when comparing with the power transmitted by the electromagnetic induction.

The reception resonant coil 310 receives power from the transmission resonant coil 220 using the resonance. The AC signal flows through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 is rectified by the rectifying unit 330 and transmitted to the load 400.

In the embodiment, the transmission induction coil 210, the transmission resonant coil 220, the reception resonant coil 310, the reception induction coil 320 may have various shapes, such as a circular shape, an elliptical shape, and a square shape, but the embodiment is not limited thereto.

The transmission resonant coil 220 of the wireless power transmitter 200 may transmit power to the reception resonant coil 310 of the wireless power receiver 300 through a magnetic field.

In detail, the transmission resonant coil 220 and the reception resonant coil 310 are resonance-coupled with each other so that the transmission resonant coil 220 and the reception resonant coil 310 operate at a resonance frequency.

The resonance-coupling between the transmission resonant coil 220 and the reception resonant coil 310 can significantly improve the power transmission efficiency between the wireless power transmitter 200 and the wireless power receiver 300.

A quality factor and a coupling coefficient are important in the wireless power transmission. That is, if at least one of the quality factor and the coupling coefficient is increased, the power transmission efficiency may be improved.

The quality factor may refer to an index of energy that may be stored in the vicinity of the wireless power transmitter 200 or the wireless power receiver 300.

The quality factor may vary according to the operating frequency as well as a shape, a dimension and a material of a coil. The quality factor may be expressed as following equation, $Q=\omega*L/R$. In the above equation, L refers to the inductance of a coil and R refers to resistance corresponding to the quantity of power loss caused in the coil.

The quality factor may have a value of 0 to infinity. As the quality factor is increased, the power transmission efficiency between the wireless power transmitter 200 and the wireless power receiver 300 may be improved.

The coupling coefficient represents the degree of magnetic coupling between a transmission coil and a reception coil, and has a value in the range of 0 to 1.

The coupling coefficient may vary according to the alignment position and distance between the transmission coil and the reception coil.

Figure 2:
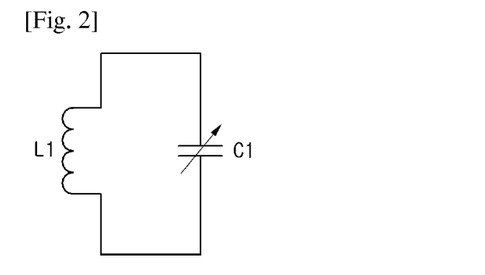
FIG. 2 is a circuit diagram showing an equivalent circuit of the transmission induction coil according to the one embodiment.

FIG. 2 is a circuit diagram showing an equivalent circuit of the transmission induction coil according to the one embodiment.

As shown in FIG. 2, the transmission induction coil 210 may include a transmission induction coil L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the transmission induction coil L1 are connected to both terminals of the capacitor C1. In other words, the transmission induction coil 210 may be constructed as an equivalent circuit in which the transmission induction coil L1 is connected to the capacitor C1 in parallel.

The capacitor C1 may include a variable capacitor, and impedance matching may be performed by adjusting the capacitance of the capacitor C1. The equivalent circuit of each of the transmission resonant coil 220, the reception resonant coil 310 and the reception induction coil 320 may be the same as the equivalent circuit shown in FIG. 2.

Figure 3:
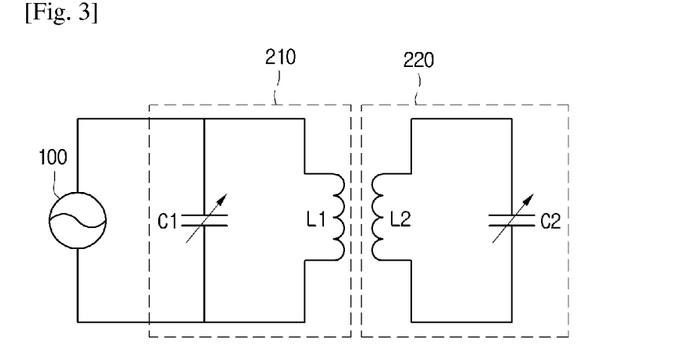
FIG. 3 is a circuit diagram showing an equivalent circuit of a power supplying apparatus and a wireless power transmitter according to one embodiment.

FIG. 3 is a circuit diagram showing an equivalent circuit of the power supplying apparatus and the wireless power transmitter according to one embodiment.

As shown in FIG. 3, the transmission induction coil 210 includes the transmission induction coil inductor L1 having predetermined inductance and a capacitor C1 having predetermined capacitance. The transmission resonant coil 220 includes an inductor L2 having predetermined inductance and a capacitor C2 having predetermined capacitance.

Figure 4:
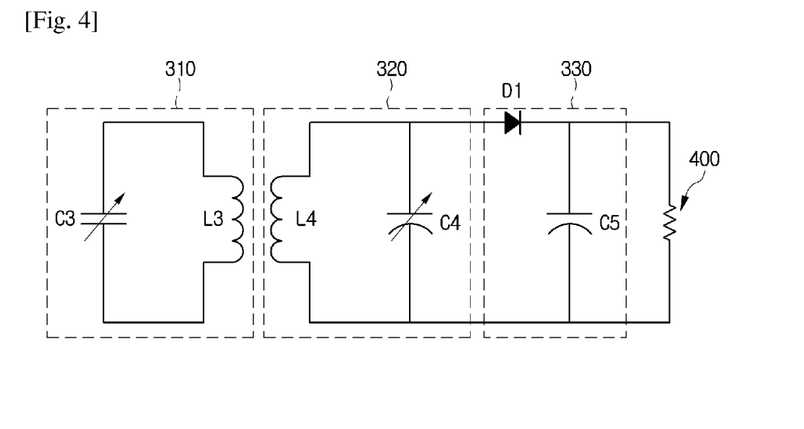
FIG. 4 is a circuit diagram showing an equivalent circuit of a wireless power receiver according to one embodiment.

FIG. 4 is a circuit diagram showing an equivalent circuit of the wireless power receiver according to one embodiment.

As shown in FIG. 4, the reception resonant coil 310 includes an inductor L3 having predetermined inductance and a capacitor C1 having predetermined capacitance. The reception induction coil 320 includes an inductor L4 having predetermined inductance and a capacitor C4 having predetermined capacitance.

The rectifying unit 330 may convert AC power from the reception induction coil 320 into the DC power and transfer the DC power to the load 400.

In detail, the rectifying unit 330 may include a rectifier and a smoothing circuit. In the embodiment, a silicon rectifier may be used as a rectifying element of the rectifier, and equalized as a diode D1 as shown in FIG. 4.

The rectifier may convert the AC power from the reception induction coil 320 into the DC power.

The smoothing circuit may output smooth DC power by removing AC components included the converted DC power from the rectifier. In the embodiment, as shown in FIG. 4, a rectification capacitor C5 may be used as the smoothing circuit, but the embodiment is not limited thereto.

The load 400 may be a predetermined rechargeable battery or a device requiring the DC power. For example, the load 400 may refer to a battery.

The wireless power receiver 300 may be installed in an electronic device, such as a cellular phone, a laptop computer or a mouse, requiring the power. Accordingly, the reception resonant coil 310 and the reception induction coil 320 may have a shape which is suited to a shape of an electronic device.

The wireless power transmitter 200 may exchange information with the wireless power receiver 300 through an in-band communication scheme or an out-of-band communication scheme.

The in-band communication refers to the communication for interchanging information between the wireless power transmitter 200 and the wireless power receiver 300 through a signal having the frequency used in the wireless power transmission. The wireless power receiver 300 may include a switch, and may receive or may not receive power transmitted from the wireless power 200 through a switching operation of the switch. Accordingly, the wireless power transmitter 200 can recognize an on-signal or an off-signal of the wireless power receiver 300 by detecting the quantity of power consumed in the wireless power transmitter 200.

In detail, the wireless power receiver 300 may change the power consumed in the wireless power transmitter 200 by adjusting the quantity of power absorbed in a resistor by using the resistor and the switch. The wireless power transmitter 200 may acquire the state information of the wireless power receiver 300 by detecting the variation of the power consumption. The switch is serially connected to a resistor. In one embodiment, state information of the wireless power receiver 300 may include information about the present current charge quantity and the change of charge quantity.

In more detail, if the switch is open, the power absorbed in the resistor becomes zero, and the power consumed in the wireless power transmitter 200 is reduced.

If the switch is short-circuited, the power absorbed in the resistor becomes greater than zero, and the power consumed in the wireless power transmitter 200 is increased. If the wireless power receiver repeats the above operation, the wireless power transmitter 200 detects power consumed therein to make digital communication with the wireless power receiver 300.

The wireless power transmitter 200 receives the state information of the wireless power receiver 300 through the above operation so that the wireless power transmitter 200 can transmit appropriate power.

To the contrary, the wireless power transmitter 200 may include a resistor and a switch to transmit the state information of the wireless power transmitter 200 to the wireless power receiver 300. In the embodiment, the state information of the wireless power transmitter 200 may include a maximum supply power amount which the wireless power transmitter 200 may transmit, and the number of wireless power receivers 300 to which the wireless power transmitter 200 provides power, and information on an available power amount of the wireless power transmitter 200.

Hereinafter, the out-of-band communication will be described.

The out-of-band communication is performed through a specific frequency band other than the resonance frequency in order to exchange information necessary for the power transmission. The wireless power transmitter 200 and the wireless power receiver 300 may exchange information necessary for the power transmission through out-of-band communication modules which are installed in the wireless power transmitter 200 and the wireless power receiver 300, respectively. The out-of-band communication module may be installed in the power supplying apparatus. In one embodiment, the out-of-band communication may use a short-distance communication technology such as Bluetooth, Zigbee, WLAN, NFC, etc., and is not limited thereto.

Hereinafter, the power supplying apparatus according to a first embodiment will be described with reference to FIGS. 5 to 12.

Figure 5:
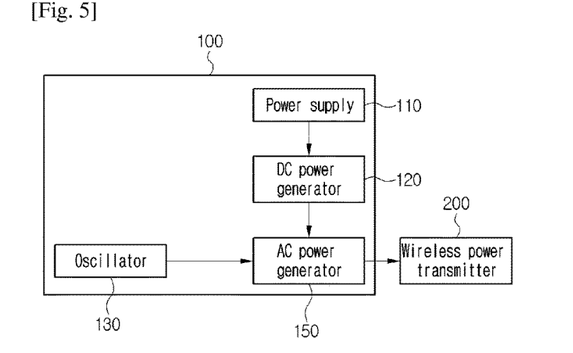
FIG. 5 is a block diagram of the power supplying apparatus according to a first embodiment.

FIG. 5 is a block diagram of the power supplying apparatus according to a first embodiment.

Referring to FIG. 5, the power supplying apparatus 100 according to the first embodiment comprises a power supply 110, a DC power generator 120, an oscillator 130, and an AC power generator 150. The power supplying apparatus 100 may be connected to the wireless power transmitter 200 or may be embedded in the wireless power transmitter 200.

The power supply 110 generates DC power with a DC voltage and outputs the DC power to an output terminal thereof. Although the DC power may be generated from an AC power supplied from the outside, the embodiment is not limited thereto.

An input terminal of the DC power generator 120 may be connected to an output terminal of the power supply 110. The DC power generator 120 converts DC power with a first DC voltage into DC power with a second DC voltage to output the DC power with the second DC voltage to an output terminal thereof.

The oscillator 130 generates an AC signal having a sine wave to output the AC signal to an output terminal thereof.

The AC power generator 150 amplifies the AC signal of the oscillator 130 using the DC power with the second DC voltage to generate AC power with an AC voltage of a square wave, and outputs the generated AC power to an output terminal thereof.

The wireless power transmitter 200 transfers the AC power with an AC voltage of a square wave to the wireless power receiver 300 by using resonance.

Figure 6:
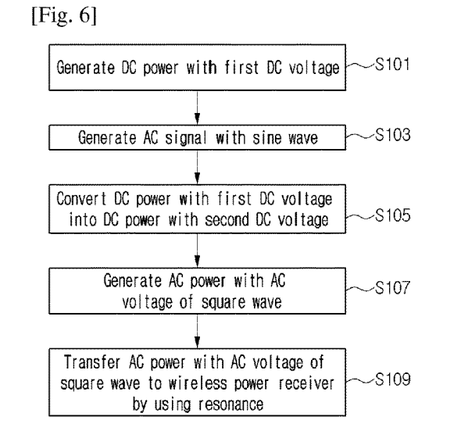
FIG. 6 is a flowchart illustrating a wireless power transmitting method according to a first embodiment.

FIG. 6 is a flowchart illustrating a wireless power transmitting method according to a first embodiment.

The power supply 110 generates DC power with a first DC voltage (S101).

The oscillator 130 generates AC signal with a sine wave (S103).

The DC power generator 120 converts DC power with a first DC voltage into DC power with a second DC voltage (S105).

The AC power generator 150 amplifies an AC signal of the oscillator 130 using the DC power with the second DC voltage to generate AC power with an AC voltage of a square wave (S107).

The wireless power transmitter 200 transfers the AC power with an AC voltage of a square wave to the wireless power receiver 300 by using resonance (S109).

Figure 7:
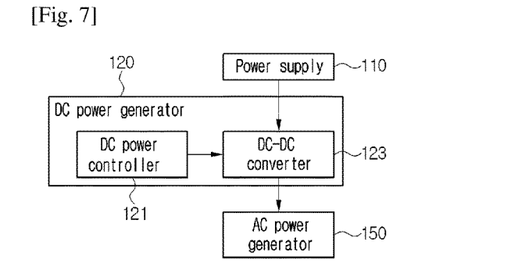
FIG. 7 is a block diagram illustrating a direct current (DC) power generator according to a first embodiment.

FIG. 7 is a block diagram illustrating a direct current (DC) power generator according to a first embodiment.

As shown in FIG. 7, the DC power generator 120 comprises a DC power controller 121 and a DC-DC converter 123, and is connected with the power supply 110 and the AC power generator 150, respectively.

The DC power controller 121 generates a DC power control signal so that the DC-DC converter 123 may convert DC power with a first DC voltage into DC power with a second DC voltage by using the DC power control signal.

The DC-DC converter 123 converts the DC power with the first DC voltage into the DC power with the second DC voltage based on a DC power control signal.

Figure 8:
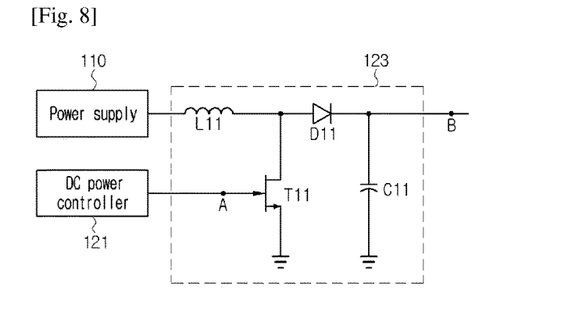
FIG. 8 is a circuit diagram illustrating a DC-DC converter according to the first embodiment.

FIG. 8 is a circuit diagram illustrating a DC-DC converter according to the first embodiment.

As shown in FIG. 8, the DC-DC converter 123 may comprise an inductor L11, a power switch T11, a diode D11, and a capacitor C11. The power switch T11 may be realized by a transistor. For example, the power switch T11 may include an n-channel metal-oxide-semiconductor field-effect transistor (NMOSFET) and may be replaced with other devices capable of performing the same function.

One terminal of the inductor L11 is connected to an output terminal of the power supply 110, and another terminal of the inductor L11.

A gate electrode of the power switch T11 is connected to a node A serving as an output terminal of the DC power controller 121, and a source electrode of the power switch T11 is connected to a ground terminal.

An anode of the diode D11 is connected to a drain of the power switch T11, and a cathode of the diode D11 is connected to a node B and the capacitor C11.

One terminal of the capacitor C11 is connected to a cathode of the diode D11, and another terminal of the capacitor C11 is connected to a ground terminal.

Figure 9:
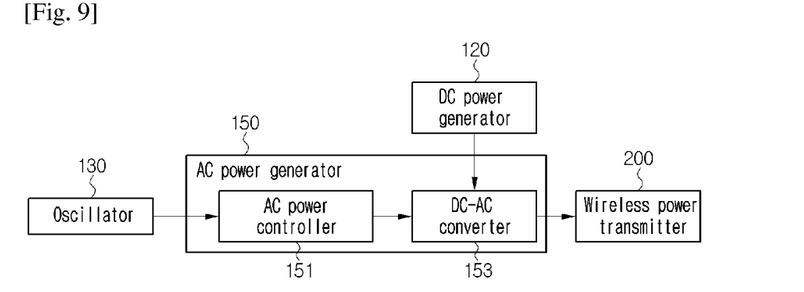
FIG. 9 is a block diagram illustrating an AC power generator according to the first embodiment.

FIG. 9 is a block diagram illustrating an AC power generator according to the first embodiment.

As shown in FIG. 9, the AC power generator 150 comprises an AC power controller 151 and a DC-AC converter 153, and is connected to the oscillator 130, the DC power generator 120, and a wireless power transmitter 200, respectively.

The AC power controller 151 generates an AC power control signal based on an AC signal with a sine wave generated from the oscillator 130.

The DC-AC converter 153 converts DC power with a second DC voltage from the DC power generator 120 into AC power with an AC voltage of a square wave based on an AC power control signal.

Figure 10:
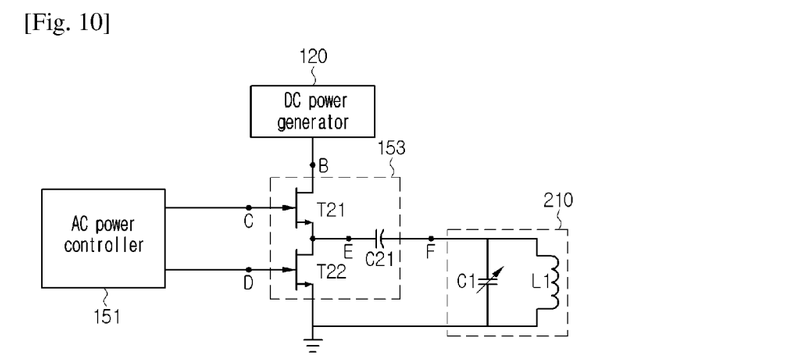
FIG. 10 is a circuit diagram illustrating a DC-AC converter according to the first embodiment.

FIG. 10 is a circuit diagram illustrating a DC-AC converter according to the first embodiment.

As shown in FIG. 10, the DC-AC converter 153 comprises an upper transistor T21, a lower transistor T22, and a DC blocking capacitor C21, and is connected to the DC power generator 120, the AC power controller 151, and the transmission induction coil 210. The upper transistor T21 and the lower transistor T22 may include an n-channel metal-oxide-semiconductor field-effect transistor (NMOSFET) and may be substituted by other devices capable of performing the same function.

The AC power controller 151 may include a first output terminal connected to a node C and a second output terminal connected to a node D. The AC power controller 151 generates an upper transistor control signal as an AC power control signal based on an AC signal with a sine wave of the oscillator 130, and supplied the upper transistor control signal to the upper transistor T21 through the node C. The AC power controller 151 generates a lower transistor control signal as the AC power control signal based on the AC signal with a sine wave of the oscillator 130, and supplied the lower transistor control signal to the lower transistor T22 through the node D.

A drain of the upper transistor T21 may be connected to the node B, a gate of the upper transistor T21 may be connected to a first output terminal of the AC power controller 151 through the node C, and a source electrode of the upper transistor T21 may be connected to a node E.

A drain of the lower transistor T22 may be connected to the node E, a gate of the lower transistor T22 may be connected to the second output terminal of the AC power controller 151 through the node D, and a source of the lower transistor T22 may be connected to the ground.

One terminal of the DC blocking capacitor C21 may be connected to the node E, and another end of the DC blocking capacitor C21 may be connected to the node F which is connected to one terminal of the transmission induction coil L1.

Hereinafter a wireless power transmitting method according to the first embodiment will be described with reference to FIGS. 11 and 12.

Figure 11:
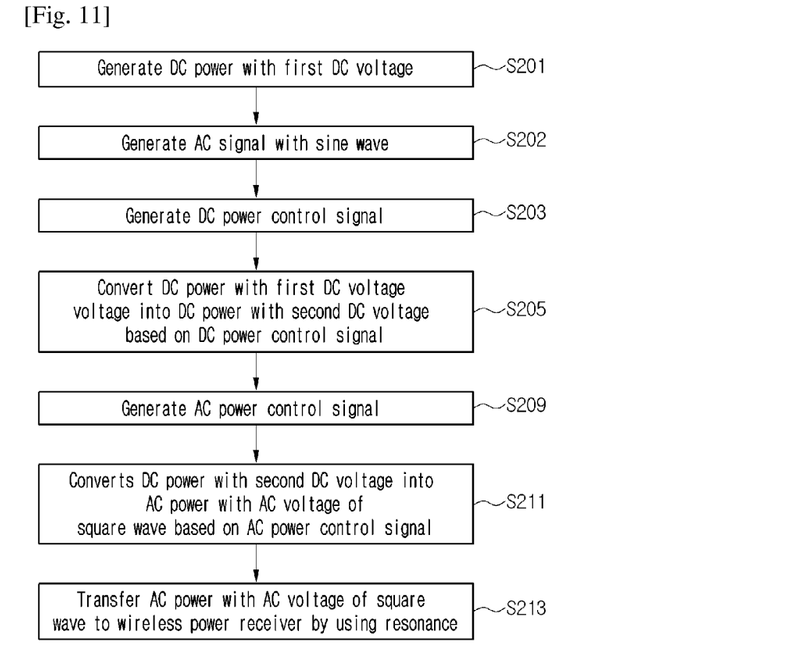
FIG. 11 is a flowchart illustrating a wireless power transmitting method according to the first embodiment.
Figure 12:
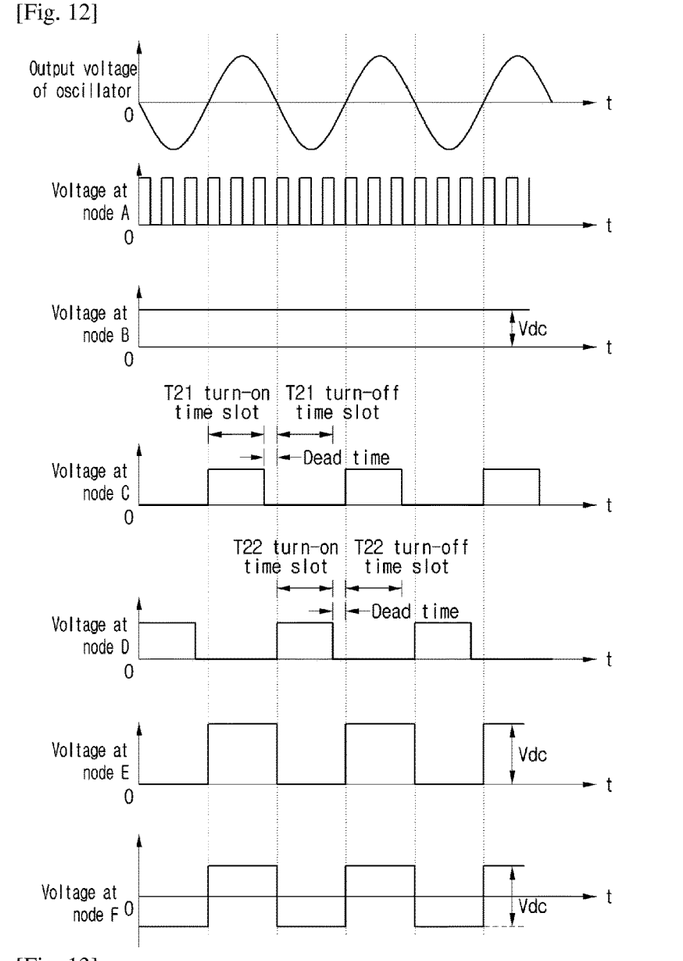
FIG. 12 is a waveform diagram of nodes in the power supplying apparatus according to a first embodiment.

FIG. 11 is a flowchart illustrating a wireless power transmitting method according to the first embodiment, and FIG. 12 is a waveform diagram of nodes in the power supplying apparatus according to a first embodiment.

In particular, FIG. 11 illustrates the wireless power transmitting method according to the embodiment shown in FIG. 6.

The power supply 110 generates DC power with a first DC voltage (S201). The power supply 110 may convert AC power with an AC voltage into DC power with a first DC voltage. In this case, the first DC voltage may include an unstable voltage.

The oscillator 130 generates an AC signal with a sine wave (S202).

The DC power controller 121 generates a DC power control signal so that the DC-DC converter 123 may convert DC power with a first DC voltage into DC power with a second DC voltage (S203), and outputs the DC power control signal to the node A. In particular, the DC power controller 121 may generate the DC power control signal using a voltage at the node B as feedback information. In this case, the DC power control signal may include a pulse width modulation (PWM) signal which is represented in entire sections as shown in FIG. 12. The DC power controller 121 may determine a duty of the PWM signal based on the voltage at the node B.

The DC-DC converter 123 converts DC power with the first DC voltage into DC power with a second DC voltage based on the DC power control signal (S205). In this case, the second DC voltage may include a stable voltage. Magnitude of the second DC voltage may be equal to, less than, or greater than the first DC voltage. As shown in FIG. 8, the DC-DC converter 173 may include a boost converter. In this case, the magnitude of the second DC voltage is greater than magnitude of the first DC voltage. For example, the magnitude of the first DC voltage may be 5 volts, and the magnitude of the second DC voltage may be 19 volts, but the embodiment is not limited thereto.

The AC power controller 151 generates an AC power control signal based on an AC signal with a sine wave of the oscillator 130 (S209). The AC power controller 151 generates an upper transistor control signal as the AC power control signal based on an AC signal with a sine wave of the oscillator 130, and may supply an upper transistor control signal to the upper transistor T21 through a node C. The AC power controller 151 may generate a lower transistor control signal as the AC power control signal based on an AC signal with a sine wave of the oscillator 130, and may supply a lower transistor control signal to the lower transistor T22 through a node D.

The upper transistor control signal and the lower transistor control signal will be described with reference to FIG. 12.

As shown in FIG. 12, the upper transistor control signal (voltage of the node C) and the lower transistor control signal (voltage of the node D) are a square wave.

One period of the upper transistor control signal sequentially includes a turn-on time slot of the upper transistor T21, a dead time slop of the upper transistor T21, and a turn-off time slot of the upper transistor T21. The turn-on time slot of the upper transistor T21 and a dead time slot of the upper transistor T21 may correspond to a half period of a sine wave of the AC signal output from the oscillator 130. The turn-off time slot of the upper transistor T21 may correspond to a remaining half period of the sine wave.

One period of the lower transistor control signal sequentially includes a turn-on time slot of the lower transistor T22, a dead time slop of the lower transistor T22, and a turn-off time slot of the lower transistor T22. The turn-on time slot of the lower transistor T22 and a dead time slot of the lower transistor T22 may correspond to a half period of a sine wave of the AC signal output from the oscillator 130. The turn-off time slot of the lower transistor T22 may correspond to a remaining half period of the sine wave.

The upper transistor control signal in the turn-on time slot of the upper transistor T21 has a level to turn-on the upper transistor T21. A level to turn-on the upper transistor T21 may be a high level.

The upper transistor control signal in the turn-off time slot of the upper transistor T21 has a level to turn-off the upper transistor T21. A level to turn-off the upper transistor T21 may be a low level.

The lower transistor control signal in the turn-on time slot of the lower transistor T22 has a level to turn-on the lower transistor T22. A level to turn-on the lower transistor T22 may be a high level.

The lower transistor control signal in the turn-off time slot of the lower transistor T22 has a level to turn-off the lower transistor T22. A level to turn-off the lower transistor T22 may be a low level.

In the turn-on time slot of the upper transistor T21, the lower transistor control signal of the turn-off time slot in the lower transistor T22 has a level to turn-off the lower transistor T22.

In the turn-on time slot of the lower transistor T22, the lower transistor control signal of the turn-off time slot in the upper transistor T21 has a level to turn-off the lower transistor T22.

In the dead time slot of the upper transistor T21, the upper transistor control signal has a level to turn-off the upper transistor T21. In the dead time slot of the lower transistor T22, the lower transistor control signal has a level to turn-off the lower transistor T22. The dead time slot of the upper transistor T21 and the dead time slot of the lower transistor T22 prevent the upper transistor T21 and the lower transistor T22 to be simultaneously turned-on so that short-circuit may be prevented.

In order to output power having a voltage of a square wave with 50% duty to the node E, the turn-on time slot of the upper transistor T21 may have a time length corresponding to (50−a) % of one period T, and a dead time slot of the upper transistor T21 may have a time length corresponding to a % of the one period T1. Further, the turn-off time slot of the upper transistor T21 may have a time length corresponding to (50−a) % of one period T, and a turn-on time slot of the lower transistor T22 may have a time length corresponding to (50−a) % of the one period T1. In addition, the dead time slot of the lower transistor T22 may have a time length corresponding to a % of one period T, and a turn-off time slot of the lower transistor T22 may have a time length corresponding to 50% of the one period T1. For example, the a may be 1%.

The DC-AC converter 153 converts DC power with a second DC voltage output from the DC power generator 120 into AC power with an AC power with a square wave based on the AC power control signal (S211), and outputs the AC power to a node F.

An operation of the DC-AC converter 153 will be described with reference to FIG. 12.

The upper transistor T21 and the lower transistor T22 output AC power with a square voltage as illustrated in FIG. 12 to the node E according to the upper transistor control signal and the lower transistor control signal with a dead time slot.

The DC blocking capacitor C21 blocks a DC current in power of a square wave to output AC power with an AC voltage of a square wave to the node F.

The wireless power transmitter 200 transfers the AC power with an AC voltage of a square wave to the wireless power receiver 300 through resonance (S213).

However, according to embodiments of FIGS. 5 to 12, when both of the upper transistor T21 and the lower transistor T22 are an N-channel MOSFET, there is a need to apply a control signal with a voltage higher than a DC voltage output from the DC power generator 120 to a gate electrode of the upper transistor T21 in order to control the upper transistor T21. This may lower a generation efficiency of AC power with a resonant frequency.

Further, when both of the upper transistor T21 and the lower transistor T22 are an N-channel MOSFET, if both of the upper transistor T21 and the lower transistor T22 are simultaneously turned-on, a short circuit is formed so that the generation efficiency of the AC power may be reduced. Accordingly, control signals with a dead time are used so that the upper transistor T21 and the lower transistor T22 are not simultaneously turned-on. This may increase complexity of generation in control signals of the upper transistor T21 and the lower transistor T22. Further, since the dead time section is very short, it is not easy to control the dead time section.

Meanwhile, the P-channel MOSFET may be used as the upper transistor T21, but types of P-channel MOSFETs are not various, a cost is expensive, and a performance is degraded as compared with the N-channel MOSFET. Further, since a response characteristic of the upper transistor T21 differs from a response characteristic of the lower transistor T22, complexity of generation in control signals of the upper transistor T21 and the lower transistor T22 is increased and the upper transistor T21 and the lower transistor T22 generate AC powers with different power amounts to reduce a power transmission efficiency.

The wireless power transmitter according to the second embodiment will be described with reference to FIGS. 13 to 16.

Figure 13:
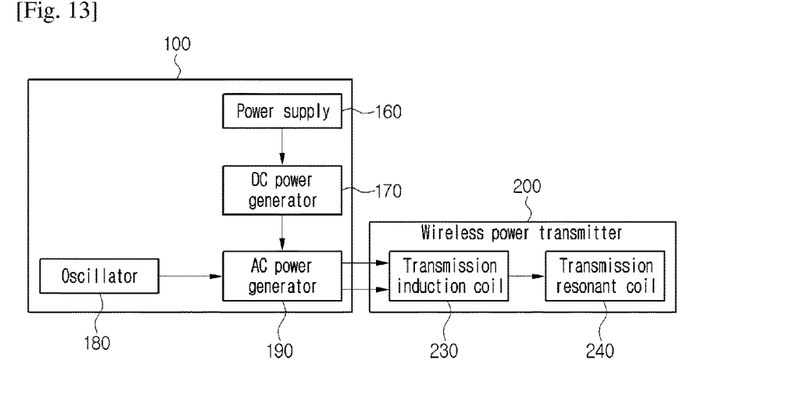
FIG. 13 is a block diagram showing a wireless power transmission system according to a second embodiment.

FIG. 13 is a block diagram showing a wireless power transmission system according to a second embodiment.

As shown in FIG. 13, the wireless power transmission system comprises a power supplying apparatus 100 and a wireless power transmitter 200. Although not shown, the wireless power transmission system may further comprises a wireless power receiver 300 configured to receive wireless AC power from the wireless power transmitter 200. The power supplying apparatus 100 may comprises a power supply 160, a DC power generator 170, an oscillator 180, and an AC power generator 190. The power supplying apparatus 100 is connected to the wireless power transmitter 200. The wireless power transmitter 200 may comprise a transmission induction coil 230 and a transmission resonant coil 240.

The transmission induction coil 230 may comprise an inductor 225 of the AC power generator 190, but the embodiment is not limited. The power supply 160 generates DC power with a first DC voltage to output the DC power to the output terminal.

The oscillator 180 generates an AC signal having a sine wave to output the AC signal to the AC power generator 150.

An input terminal of the DC power generator 170 is connected to an output of the power supply 160. The DC power generator 170 converts power with a first DC voltage into power with a second DC voltage to output the power with the second DC voltage to the output terminal. A construction of the DC power generator 170 may be equal or similar to a construction of the DC power generator 120.

The AC power generator 190 generates first AC power with a first AC voltage and second AC power with a second AC voltage using second AC power of the DC power generator 170 based on an AC signal with a sine wave of the oscillator 180. In this case, the first AC voltage and the second AC voltage may have the same amplitude. The first AC voltage and the second AC voltage may have opposite phases to each other. For example, when the AC voltage has a high level, the second AC voltage may have a low level.

An input terminal of the transmission induction coil 230 is connected to an output terminal of the AC power generator 190. The transmission induction coil 230 transfers the first AC power and the second AC power output from the AC power generator 190 to the transmission resonant coil 240 by using electromagnetic induction. Accordingly, AC power with an AC voltage, which is obtained by adding a first AC voltage of first AC power to a second AC voltage of second AC power as represented as a voltage at a node L of FIG. 16, may be generated by the transmission resonant coil 240. In this case, the first AC voltage may be added in a direction of a positive polarity with respect to 0 V, and the second AC power may be added in a direction of a negative polarity with respect to 0 V. Accordingly, the added AC voltage may have amplitude greater than amplitude of the first AC voltage or the second AC voltage. For example, the added AC voltage may have magnitude twice greater than the magnitude of the first AC voltage or the second AC voltage.

Figure 14:
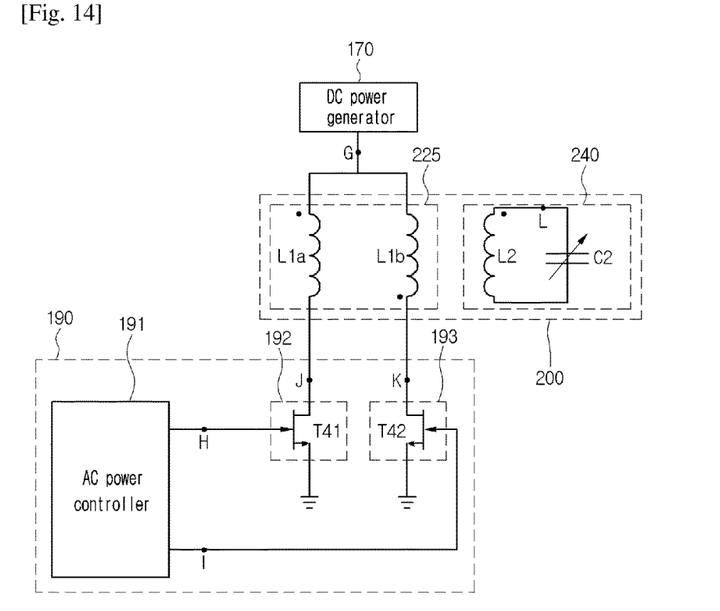
FIG. 14 is a circuit diagram illustrating a wireless power transmitting system according to a second embodiment.

Meanwhile, in case that the inductor 225 of the AC power generator 190 is substituted by the transmission induction coil 230, as shown in FIG. 14, the first AC power with the first AC voltage and the second AC power with the second AC voltage generated from the inductor 225 of the AC power generator 190 may be directly transferred to the transmission resonant coil 240 by using electromagnetic induction.

The transmission resonant coil 240 transfers the power received from the transmission induction coil 230 to the wireless power receiver 300 by using resonance.

FIG. 14 is a circuit diagram illustrating a wireless power transmitting system according to a second embodiment.

As shown in FIG. 14, the AC power generator 190 comprises an AC power controller 191, a first switching device 192, and a second switching device 193.

The inductor 225 may be included in the AC power generator 190.

The first switching device 192 includes a transistor T41. The second switching device 193 includes a transistor T42. For example, the first switching device T41 and the second switching device T42 may include an n-channel metal-oxide-semiconductor field-effect transistor (NMOSFET) and may be replaced with other devices capable of performing the same function. Source electrodes of the first switching device T41 and the second switching device T42 may be connected to a ground terminal in command.

The transmission resonant coil 240 may be disposed close to the inductor 225. Accordingly, first AC power with a first AC voltage generated from the inductor 225 and second AC power with a second AC voltage may be transferred to the transmission resonant coil 240 through electromagnetic induction.

The inductor 225 may be included in the transmission induction coil 230 or may be formed separately from the transmission induction coil 230.

When the inductor 225 is formed separately from the transmission induction coil 230, the transmission induction coil 230 may be disposed close to the inductor 225 and the transmission resonant coil 240 may be disposed close to the transmission induction coil 230.

The inductor 225 may include a first inductor L1a and a second inductor L1b.

The first inductor L1a may include a first coil with predetermined inductance. The second inductor L1b may include a second coil with predetermined inductance.

A winding direction of the first coil of the first inductor L1a may be opposite to a winding direction of the second coil of the second inductor L1b.

The first inductor L1a and the second inductor L1b may the same inductance, but the embodiment is not limited thereto.

One terminal of the first inductor L1a may be connected to an output terminal of the DC power generator 170, and another terminal of the first inductor L1a may be connected to the first switching device 192.

One terminal of the second inductor L1b may be connected to an output terminal of the DC power generator 170, and another terminal of the second inductor L1b may be connected to the second switching device 193.

The first inductor L1a and the second inductor L1b may be connected to each other in parallel.

The transmission resonant coil 240 includes a transmission resonant coil L2 and a capacitor C2. Both terminals of the transmission resonant coil L2 are connected to both terminals of the capacitor C2, respectively. One terminal of the transmission resonant coil L2 becomes a node L.

The transmission resonant coil 240 may convert first DC power with a first DC voltage from the DC power generator 170 into second DC power with a second DC voltage to output the second DC power with the second DC voltage to a node G.

The AC power controller 191 may generate a first AC power control signal to provide the first AC power control signal to the first switching device 192 through a node H, and may generate a second AC power control signal to provide the second AC power control signal to the second switching device 193 through a node I.

A transistor T41 includes a drain connected to a node J, a gate connected to a node H, and a source connected to a ground terminal.

A transistor T42 include a drain connected to a node K, a gate connected to a node I, and a source connected to the ground terminal.

The transistor T41 and the transistor T42 may be connected to each other in parallel.

The first inductor L1a includes one terminal connected to the node G and another terminal connected to a node J. The first inductor L1a and the transmission resonant coil L2 are inductively coupled with each other. A winding direction of the first inductor L1a may be equal to a winding direction of the transmission resonant coil L2 of the transmission resonant coil 240.

The second inductor L1b includes one terminal connected to the node G and another terminal connected to a node K. The second inductor L1b and the transmission resonant coil L2 are inductively coupled with each other. A winding direction of the second inductor L1b may be opposite to a winding direction of the transmission resonant coil L2 of the transmission resonant coil 240.

Hereinafter, a wireless power transmitting method according to the second embodiment will be described with reference to FIGS. 15 and 16.

Figure 15:
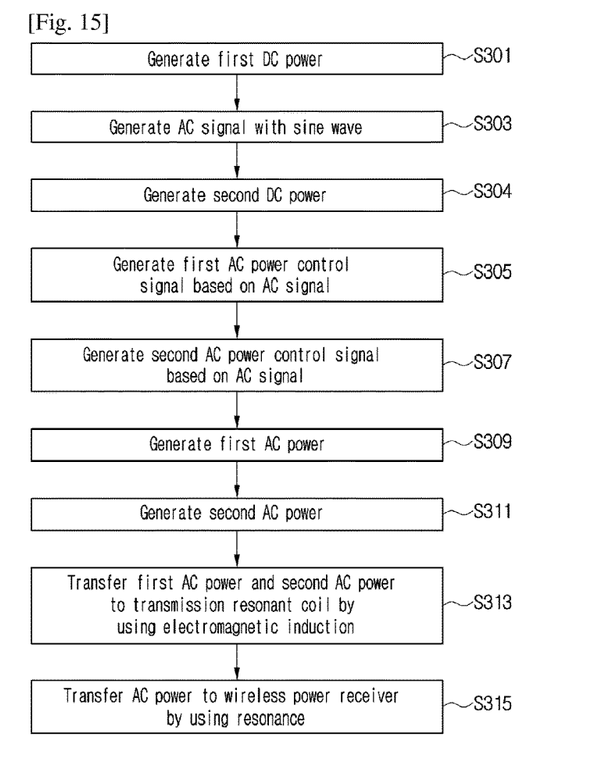
FIG. 15 is a flowchart illustrating a wireless power transmitting method according to the second embodiment.
Figure 16:
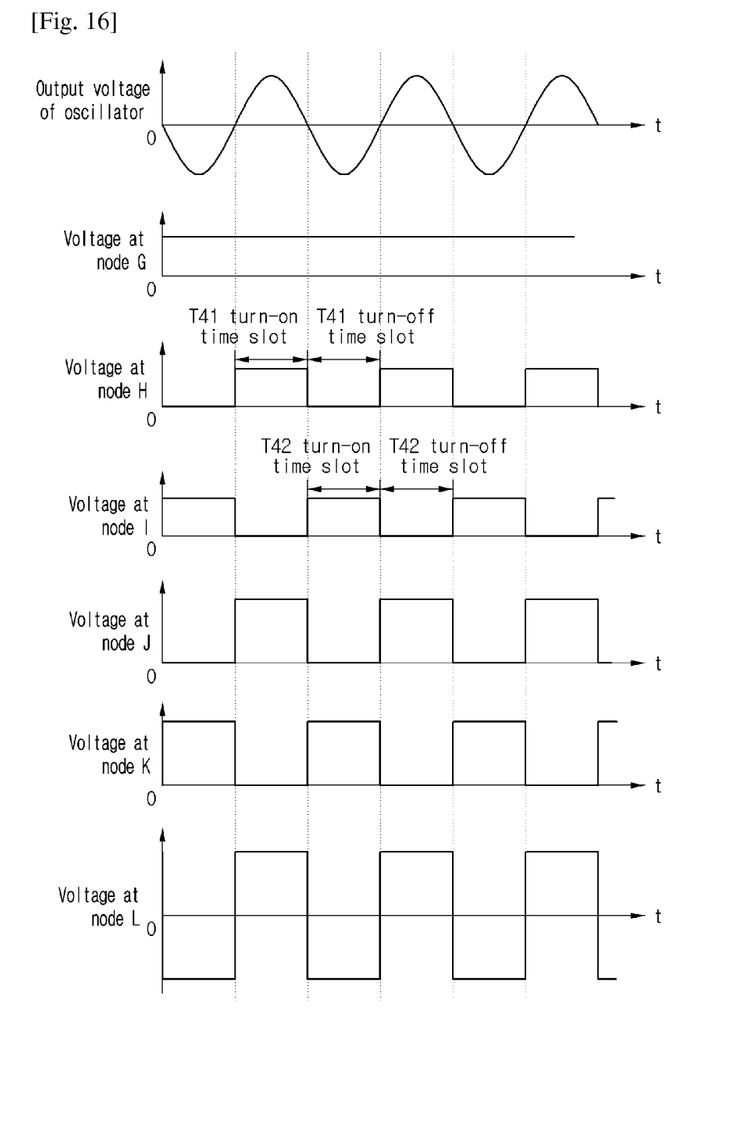
FIG. 16 is a waveform diagram of nodes in the power supplying apparatus according to a second embodiment.

FIG. 15 is a flowchart illustrating a wireless power transmitting method according to the second embodiment, and FIG. 16 is a waveform diagram of nodes in the power supplying apparatus according to a second embodiment.

A power supply 160 generates first DC power being power with a first DC voltage (S301). In particular, the power supply 160 may convert AC power with an AC voltage into first DC power with a first DC voltage. In this case, the DC voltage may be an unstable voltage.

The oscillator 130 generates an AC signal with a sine wave (S303).

The DC power generator 170 generates second DC power with a second DC voltage (S304) to output the second DC power to the node G. In this case, as shown in FIG. 16, the second DC voltage may be a stable constant DC voltage. Magnitude of the second DC voltage may be equal to, less than, or greater than the magnitude of the first DC voltage. As shown in FIG. 8, the DC-DC converter 173 may include a boost converter. In this case, magnitude of the second DC voltage is greater than magnitude of the first DC voltage. For example, the magnitude of the first DC voltage may be 5 volts, and the magnitude of the second DC voltage may be 19 volts.

The AC power controller 191 generates a first AC power control signal based on an AC signal with a sine wave to output the first AC power control signal to a node H (S305).

The AC power controller 191 generates a second AC control signal based on the AC signal with a sine wave to output the second AC power control signal to a node I (S307).

The first AC power control signal and the second AC power control signal will be described with reference to FIG. 16.

As shown in FIG. 16, the first AC power control signal and the second AC power control signal may be a square wave. The first AC power control signal and the second AC power control signal may have a duty rate of 50%. The first AC power control signal and the second AC power control signal may have opposite phases to each other.

One period of the AC power control signal includes a turn-on time slot of the transistor T41 and a turn-off time slot of the transistor T41.

One period of the second AC power control signal includes a turn-on time slot of the transistor T42 and a turn-off time slot of the transistor T42.

The first AC power control signal in the turn-on time slot of the transistor T41 has a level to turn-on the transistor T41. The level to turn-on the transistor T41 may be a high level.

The first AC power control signal in the turn-off time slot of the transistor T41 has a level to turn-off the transistor T41. The level to turn-off the transistor T41 may be a low level.

The second AC power control signal in the turn-on time slot of the transistor T42 has a level to turn-on the transistor T41. The level to turn-on the transistor T42 may be a high level.

The second AC power control signal in the turn-off time slot of the transistor T42 has a level to turn-off the transistor T41. The level to turn-off the transistor T42 may be a low level.

In the turn-on time slot of the transistor T41, the second AC power control signal of a turn-off time slot of the transistor T42 has a level to turn-off the transistor T42.

In the turn-on time slot of the transistor T42, the second AC power control signal of a turn-off time slot of the transistor T42 has a level to turn-off the transistor T42.

The turn-on time slot of the transistor T41 may have a time length corresponding to 50% of one period T, the turn-off time slot of the transistor T41 may have a time length corresponding to 50% of one period T, the turn-on time slot of the transistor T42 may have a time length corresponding to 50% of one period T, and the turn-off time slot of the transistor T42 may have a time length corresponding to 50% of one period T.

The transistor T41 may be turned-on according to a first AC power control signal at a high level, and the transistor T42 may be turned-off according to a second AC power control signal at a low level. In this case, a current according to a second DC voltage of the second DC power output from the DC power generator 170 flows to the first inductor L1a and the transistor T41. The first AC power with the first AC voltage may be generated by the first inductor L1a (S309).

The transistor T41 may be turned-off according to a first AC power control signal at a low level, and the transistor T42 may be turned-on according to a second AC power control signal at a high level. In this case, a current according to the second DC voltage of the second DC power output from the DC power generator 170 flows to the second inductor L1b and the transistor T42. The second AC power with the second AC voltage may be generated by the second inductor L1b (S311).

The first AC power may be transferred to the transmission resonant coil 240 in a resonance scheme, and the second AC power may be transferred to the transmission resonant coil 240 in the in a resonance scheme (S313). As shown in FIG. 16 (node L), the first AC power and the second AC voltage may be symmetrical to each other based on 0 V and may have opposite phases. For example, the first AC voltage may have a direction of a positive polarity to 0 V, and the second AC voltage may have a direction of a negative polarity to 0 V. Accordingly, the AC voltage of the AC power generated from the transmission resonant coil 240 is defined as a width between amplitude of the first AC voltage and amplitude of the second AC voltage, and may have amplitude smaller than the amplitude of the first AC voltage and the amplitude of the second AC voltage.

In this manner, the AC power with the AC voltage of large amplitude may be transferred to the wireless power receiver 300 using the resonance scheme (S315).

Therefore, since power to be transmitted may be easily generated according to the embodiment, the power transmission efficiency can be improved.

The embodiment is applicable to a transmitting apparatus capable of transmitting power to an electronic device such as a portable phone, a notebook computer, and a mouse requiring power in a wireless scheme.

The invention claimed is:

1. A power supplying apparatus comprising:
a power supply configured to generate a first direct current (DC) power having a first DC voltage;
a DC power generator configured to convert the first DC power having the first DC voltage into a second direct current (DC) power having a second DC voltage;
an alternating current (AC) power generator comprising an inductor configured to generate an AC power based on the second DC power; and
an oscillator configured to generate an AC signal to supply the AC signal to the AC power generator,
wherein the AC power comprises a first AC power having a first AC voltage and a second AC power having a second AC voltage, and the first AC voltage and the second AC voltage have phases opposite to each other,
wherein the AC power generator comprises a switching device connected to the inductor and switching-controlled in order to generate the first AC power and the second AC power, and an AC power controller configured to generate first and second AC power control signals based on the AC signal in order to control the switching device,
wherein the inductor comprises first and second inductors connected to the power supply in parallel,
wherein the switching device comprises first and second switching devices connected to the first and second inductors, respectively,
wherein the first and second inductors are both inductively coupled with a transmission resonant coil,
wherein a turn-on time slot of the first switching device has a time length corresponding to 50% of one period, a turn-off time slot of the first switching device has a time length corresponding to 50% of one period, a turn-on time slot of the second switching device has a time length corresponding to 50% of one period, and a turn-off time slot of the second switching device has a time length corresponding to 50% of one period,
wherein during the turn-on time slot of the first switching device, the second AC power control signal having a level to turn-off the second switching device is supplied to the second switching device during the turn-off time slot of the second switching device, and
wherein the transmission resonant coil is configured to wirelessly transmit power from the first and second inductors to another external device.

2. The power supplying apparatus of claim 1, wherein the AC power generator generates the first AC power and the second AC power under the control of the AC signal.

3. The power supplying apparatus of claim 1, wherein, when one of the first and second AC voltages is at a high level, the other is at a low level.

4. The power supplying apparatus of claim 1, wherein a winding direction of the first inductor is equal to a winding direction of the transmission resonant coil.

5. The power supplying apparatus of claim 4, wherein a winding direction of the second inductor is opposite to the winding direction of the transmission resonant coil.

6. The power supplying apparatus of claim 1, wherein the AC power control signal comprises first and second AC power control signals to be supplied to the first and second switching devices, respectively, and the first and second AC power control signals have phases opposite to each other.

7. The power supplying apparatus of claim 6, wherein the first AC power is generated by the first inductor under the switching control of the first switching device in response to the first AC power control signal.

8. The power supplying apparatus of claim 6, wherein the second AC power is generated by the second inductor under the switching control of the second switching device in response to the second AC power control signal.

9. The power supplying apparatus of claim 5, wherein the first and second inductor comprise coils, respectively.

10. The power supplying apparatus of claim 9, wherein a winding direction of the coil of the first inductor is opposite to a winding direction of the coil of the second inductor.

11. The power supplying apparatus of claim 5, wherein the first and second switching devices are commonly connected to a ground terminal.

12. The power supplying apparatus of claim 5, wherein the first and second switching devices are switching-controlled by a unit of a half period of the AC signal.

13. A wireless power transmitter comprising:
a power supply configured to generate a first direct current (DC) power; and
a DC power generator configured to convert the first DC power having the first DC voltage into a second direct current (DC) power having a second DC voltage;
an alternating current (AC) power generator comprising an inductor configured to generate an AC power based on the second DC power;
an oscillator configured to generate an AC signal to supply the AC signal to the AC power generator; and
a transmission coil configured to transmit the AC power to a wireless power receiver,
wherein the AC power comprises a first AC power with a first AC voltage and a second AC power with a second AC voltage, and the first AC voltage and the second AC voltage have phases opposite to each other,
wherein the transmission coil comprises a transmission resonant coil configured to transmit the AC power from the transmission induction coil to the wireless power receiver,
wherein the inductor comprises a first inductor and a second inductor connected to the power supply in parallel,
wherein the AC power generator comprises:
a first switching device connected to the first inductor and switching-controlled to allow the first inductor to generate the first AC power;
a second switching device connected to the second inductor and switching-controlled to allow the second inductor to generate the second AC power; and
an AC power controller configured to generate first and second AC power control signals based on the AC signal in order to control the switching device,
wherein the first and second inductors are both inductively coupled with a transmission resonant coil,
wherein a turn-on time slot of the first switching device has a time length corresponding to 50% of one period, a turn-off time slot of the first switching device has a time length corresponding to 50% of one period, a turn-on time slot of the second switching device has a time length corresponding to 50% of one period, and a turn-off time slot of the second switching device has a time length corresponding to 50% of one period,
wherein the transmission resonant coil is inductively coupled with one transmission induction coil,
wherein during the turn-on time slot of the first switching device, the second AC power control signal having a level to turn-off the second switching device is supplied to the second switching device during the turn-off time slot of the second switching device, and
wherein the one transmission resonant coil combines the first AC power and the second AC power to generate a third AC power and the one transmission resonant coil is configured to transfer the third AC power to a wireless power receiver, via the transmission resonant coil.

14. The wireless power transmitter of claim 13, wherein a winding direction of the first inductor is equal to a winding direction of the transmission resonant coil.

15. The wireless power transmitter of claim 14, wherein a winding direction of the second inductor is opposite to the winding direction of the transmission resonant coil.

16. The wireless power transmitter of claim 13, wherein the one transmission induction coil is spaced apart from the inductor.

17. The wireless power transmitter of claim 13, wherein an amplitude of an AC voltage of the third AC power is greater than an amplitude of the first AC voltage of the first AC power and an amplitude of the second AC voltage of the second AC power.

* * * * *